United States Patent [19]
Zabroski

[11] 3,976,986
[45] Aug. 24, 1976

[54] EMERGENCY LAMP AND SOLID STATE SWITCHING CIRCUIT THEREFOR

[76] Inventor: Stanley E. Zabroski, 910 N. "G" St., Oxnard, Calif. 93030

[22] Filed: Dec. 20, 1974

[21] Appl. No.: 534,692

Related U.S. Application Data

[63] Continuation of Ser. No. 401,400, Sept. 27, 1973, abandoned.

[52] U.S. Cl. .................... 340/253 C; 240/10.6 CH; 307/66
[51] Int. Cl.² ........................................ G08B 21/00
[58] Field of Search ................. 240/10.6 CH, 52.1; 340/248 Y, 253 C; 307/66

[56] References Cited
UNITED STATES PATENTS

| | | | |
|---|---|---|---|
| 2,876,410 | 3/1959 | Fry | 240/10.6 CH X |
| 3,002,105 | 9/1961 | Cady | 307/64 |
| 3,159,755 | 12/1964 | Duncan | 307/66 X |
| 3,189,788 | 6/1965 | Cady | 340/253 C X |
| 3,294,977 | 12/1966 | Duncan | 307/66 |
| 3,324,304 | 6/1967 | Duncan | 307/66 |
| 3,739,226 | 6/1973 | Seiter et al. | 240/10.6 CH X |
| 3,746,877 | 7/1973 | Seiter et al. | 307/66 |

FOREIGN PATENTS OR APPLICATIONS

| | | | |
|---|---|---|---|
| 1,070,289 | 12/1959 | Germany | 240/10.6 CH |

*Primary Examiner*—Fred L. Braun
*Attorney, Agent, or Firm*—Poms, Smith, Lande & Glenny

[57] ABSTRACT

A battery operated emergency lamp is provided for connection to a normally "on" electrical source of power, such as a standard ac line voltage, where such source is subject to occasional power failures. A solid state switching circuit including a single transistor and one diode serves to maintain the lamp in an unenergized condition and to simultaneously generate a low charging current for a re-chargeable battery so long as the power source remains "on." In the event of a power interruption, the solid state switching circuit is immediately responsive to switch to a condition in which the lamp is energized by the battery current. In one embodiment disclosed herein, the emergency lamp takes the form of a relatively small, portable lantern or flashlight equipped with a standard utility plug for connection to a household electrical outlet. With the lamp plugged into the wall receptacle, the light source is maintained in an unenergized state while the rechargeable battery is continously charged for availability in the event of an emergency blackout or other power loss. When the power failure does occur, the lamp is automatically turned "on" to provide emergency light and to indicate the position of the device for removal from the wall receptacle and use as a portable flashlight. Additionally, the light may be employed as a convenient, always ready, portable lantern in which its removal from the electrical receptacle automatically energizes the light.

4 Claims, 9 Drawing Figures

EMERGENCY LAMP AND SOLID STATE SWITCHING CIRCUIT THEREFOR

This is a continuation of application Ser. No. 401,400, filed Sept. 27, 1973, now abandoned.

BACKGROUND OF THE INVENTION

The utility of battery operated, emergency light sources for industrial and office buildings is well established. Typically such devices are permanently connected to the line voltage normally available within the plant or office building and include a relatively powerful lamp for energization by a heavy, bulky storage battery. The battery for example may be a series of wet cells and the device may provide for automatically maintaining the proper charge on the battery.

Although this equipment is probably suitable for its particular application, the large size, high cost and permanent mounting of these known emergency light sources renders them impractical for home use. Nevertheless, it would be desirable to provide a similar, although more versatile emergency light for use in the home, small shop or office, and similar circumstances where low cost, small or compact size, and portability are functional and desirable features. The value of such a home emergency light is particularly apparent for communities or regions where power "black-outs" can or are likely to occur.

Another disadvantage of existing emergency lighting equipment lies in their complex and many times unreliable control circuitry for sensing the loss of power and connecting the lamp across the storage battery in response thereto. For example, many known devices employ moving parts such as electromechanical relays and switches. Such components may malfunction after sitting unused for many months or years. Furthermore, the relatively high component cost of such electromechanical devices, when incorporated into the control circuit for the light source, preclude any substantial reduction in the overall cost of the unit.

Accordingly, it is one object of the present invention to provide a low cost, convenient emergency lamp adapted for connection to a normally available source of power, such as household line voltage, wherein the light source is automatically energized in the event of a power loss.

A further object of the present invention is to provide such an emergency lamp in the form of a small, compact portable unit, similar to a flashlight, which may be detachably plugged into a standard household utility outlet or receptacle.

Another object of the present invention is to provide an emergency lamp of the characteristics above indicated, having a rechargeable storage battery which may be continuously charged by the normally available power source, such that the battery is always maintained in a condition for emergency use.

Still a further object of the present invention is to provide a relatively simple, extremely low cost, reliable solid state switching circuit for automatically charging a re-chargeable battery and simultaneously maintaining the lamp unenergized in response to the continued presence of an external source of power, e.g., household or line voltage, and for energizing the lamp from the battery in the event of loss of such external power.

Additionally, it is an object of the present invention to provide a portable, emergency lamp having the foregoing characteristics in which the lamp is selectively deenergized by detachable connection to a source of external power and is energized by detaching the unit from such external power, such that no electromechanical switch is required.

Still another object of the present invention is to provide an extremely reliable, low cost, solid state switching circuit for use in controlling the emergency lamp disclosed herein or for general switching applications.

A battery operated emergency lamp is provided for connection to a normally "on" electrical source of power, such as a standard ac line voltage, where such source is subject to occasional power failures. A solid state switching circuit including a single transistor and one diode serves to maintain the lamp in an unenergized condition and to simultaneously generate a low charging current for a rechargeable battery so long as the power source remains "on." In the event of a power interruption, the solid state switching circuit is immediately responsive to switch to a condition in which the lamp is energized by a battery current. In one embodiment disclosed herein, the emergency lamp takes the form of a relatively small, portable lantern or flashlight equipped with a standard utility plug for connection to a household electrical outlet. With the lamp plugged into the wall receptacle, the light source is maintained in an unenergized state while the rechargeable battery is continuously charged for availability in the event of an emergency blackout or other power loss. When the power failure does occur, the lamp is automatically turned "on" to provide emergency light and to indicate the position of the device for removal from the wall receptacle and use as a portable flashlight. Additionally, the light may be employed as a convenient, always ready, portable lantern in which its removal from the electrical receptacle automatically energizes the light.

Other embodiments of the invention are also provided. For example, the external power source subject to failure, may be either the alternating current line voltage referred to above, or a direct current source such as provided by a dc line voltage on marine craft.

Although one of the embodiments of the invention has the feature of not requiring any electromechanical or other manually operated switch for turning the lamp on or off, an alternative embodiment disclosed herein provides such a switch to afford certain auxiliary lighting modes.

These and further objects and various advantages of the emergency lamp and solid state switching circuit according to the present invention will become apparent to those skilled in the art from a consideration of the following detailed description and appended drawings of certain exemplary embodiments thereof.

DESCRIPTION

Figure 1:
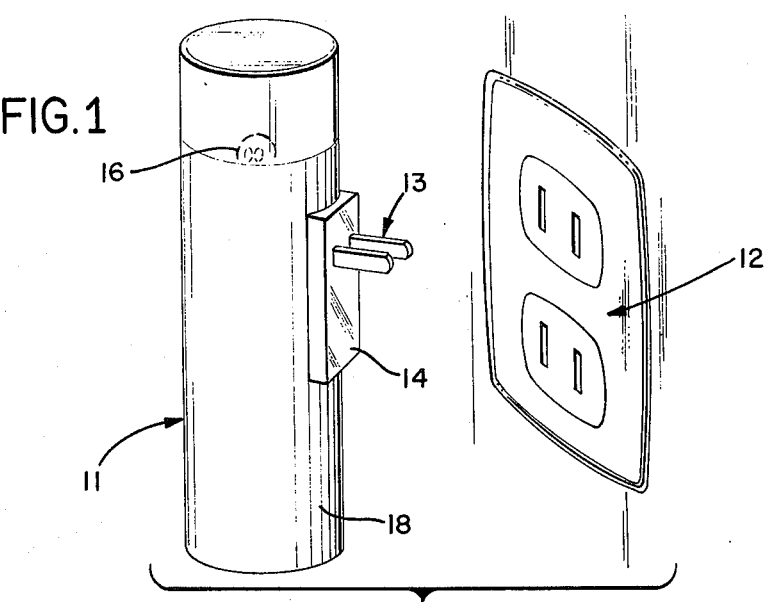
FIG. 1 is a perspective view of the embodiment of the invention providing a portable emergency light source adapted to be plugged in to a standard utility receptacle having line voltage normally available thereat.
Figure 2:
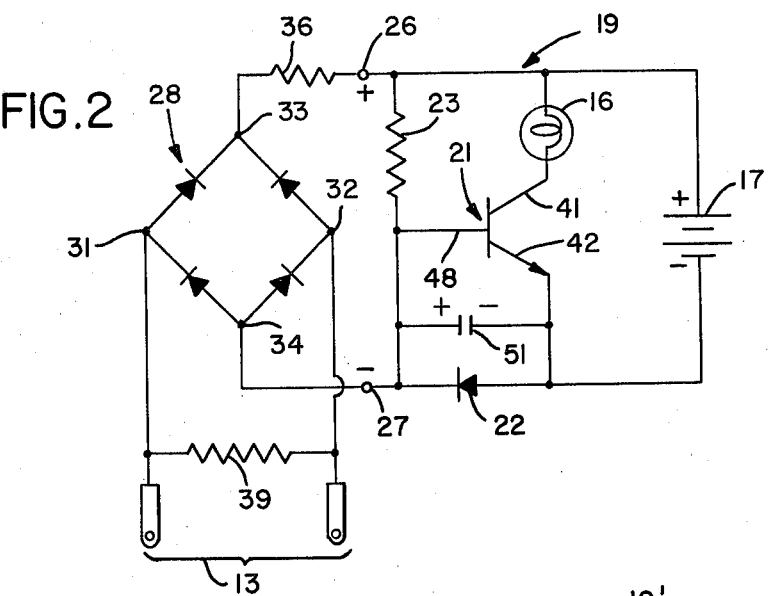
FIG. 2 is a schematic diagram of the solid state switching circuit and associated circuitry for the portable, emergency lamp of FIG. 1.

With reference to FIGS. 1 and 2 the invention is here embodied in a portable, emergency lamp 11 for detachable, plugged-in connection to a standard utility receptacle 12. Lamp 11 may be shaped as illustrated much like a flashlight, or in any other suitable shape for hand-held portability. A standard two-prong plug 13 is mechanically secured to a housing 14 affixed to the outer circumference of the here cylindrically shaped body of lamp 11 such that the entire unit is not only electrically connected, but is physically supported relative to receptacle 12 when plugged in. Receptacle 12 may be mounted on a wall or at any other convenient location for receiving and thus holding lamp 11.

When electrically and mechanically secured in receptacle 12, a light bulb 16 carried by lamp 11 is unenergized so long as receptacle 12 receives the normal household line voltage. During this time a rechargeable battery 17 which is carried within the hollow cylindrical body 18 of lamp 11 is continuously charged by a very small current sometimes referred to as a trickle charge.

If the line voltage suddenly fails at receptacle 12, a solid state switching circuit means 19 immediately switches to a condition which causes light bulb 16 to become energized by battery 17. Similarly, if lamp 11 and plug 13 are removed from receptacle 12, circuit means 19 sees this merely as a loss of power and again bulb 16 is immediately and automatically energized by battery 17. In either event, lamp 11 is conveniently availabe for use. In the case of emergency power failure, not only does the lamp provide emergency room light while in receptacle 12, it is also available as a portable flashlight source upon removal from receptacle 12. If the lights suddenly go out, the location of lamp 11 is conveniently indicated by the energization of bulb 16 immediately upon loss of power, such that the user can go directly to lamp 11 and remove it from the receptacle whereupon it remains energized by the battery. This can be extremely convenient for providing a portable light for use in restoring a circuit breaker or replacing a fuse in the event of a power failure due to a circuit overload.

For this application, the solid state switching circuit means 19 must of course be sufficiently small and compact to fit within a portable lamp such as lamp 11, and for household purposes the circuit must be capable of being mass manufactured at a low cost and exhibit substantial reliability. These features are provided by the solid state circuit means 19 which according to this embodiment of the invention is constructed of a single transistor 21, one diode 22 and a biasing resistor 23. It is these three components which essentially comprise the switching circuit and provide the selective on-off condition of light bulb 16.

As the normally available, external source of power is here provided by the standard ac line voltage, it is necessary to convert the ac potential available at plug 13 to a direct current voltage for application across terminals 26 and 27 of circuit means 19. Accordingly, the electrical means which serve to provide the connection between the power available at receptacle 12 and terminals 26 and 27 includes rectification means shown here in the form of a full wave diode rectifier bridge 28 having a first pair of diagonally opposed junctions 31 and 32 connected individually to each of the pair of prongs forming plug 13 and having a second set of diagonally opposed junctions 33 and 34 connected to supply the rectified voltage to terminals 26 and 27. As the line voltage may be as high as 115 to 117 volts ac, it is desirable to drop the rectified voltage down to a suitably low dc voltage level, for example 6 to 24 volts, for operating the solid state circuit components and for charging battery 17. For this purpose the embodiment of the invention shown in FIG. 1 employs a dropping resistor 36 for dropping the rectified voltage available from bridge 28 down from approximately line voltage to a voltage just slightly exceeding the voltage across battery 17.

Figure 5:
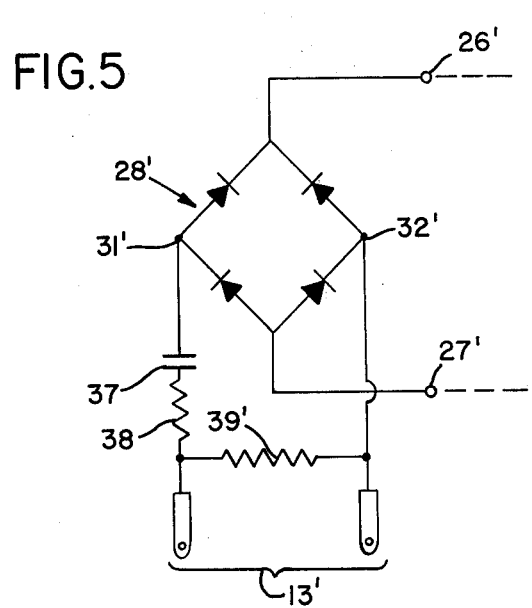
FIG. 5 is a schematic diagram of an alternative power conversion circuit for use in lieu of the conversion circuit shown in FIG. 2.

As an alternative circuit arrangement for achieving this same purpose, reference is made to FIG. 5 in which a capacitive-resistive circuit precedes the diode bridge circuit 28' for dropping the ac voltage prior to rectification by the bridge. In particular, one of the leads connected between plug 13 and junctions 31' and 32' of bridge 28' is made up of a serially connected capacitive-resistive network of known construction and operation, here provided by capacitor 37 and resistor 38. These components form a phase shifting network which drops the effective ac voltage applied across bridge 28 without necessitating any substantial real power dissipation.

In both of the circuits shown in FIGS. 2 and 5, a peak suppression resistor 39 and 39' may be provided across the incoming line voltage as illustrated.

So long as an external source of power is applied across terminals 26 and 27 solid state switching circuit means 19 operates to serve two simultaneous functions. First, tansistor 21 assumes a high impedance condition in which first and second electrodes 41 and 42, here corresponding to the transistors collector and the emitter electrodes, are connected in series with light bulb 16 as illustrated to maintain the bulb substantially unenergized. That is, the high impedance between electrodes 41 and 42 prevent any substantial current flow through bulb 16 and thus maintain it in an "off" state.

At this same time the other function of circuit means 19 is carried out by allowing a charging current $I_c$ to flow from the positive terminal 26 of the applied external voltage source through battery 17 in the reverse direction from its normal current flow so as to apply a suitably small, trickle charge current thereto. The charging current $I_c$ is sufficiently small to enable the battery 17 to remain in a charging condition indefinitely while lamp 11 is plugged in to receptacle 12. These two functions are provided during one condition of the circuit, that is during the high impedance condition of transistor 21.

The other operating mode of solid state switching circuit means 19 occurs when the external source of power applied to terminals 26 and 27 is removed, such as occurs in the event of a power loss at receptacle 12. In such case, transistor 21 assumes a low impedance condition between electrodes 41 and 42 and the series circuit thereof with bulb 16 connected across battery 17 permits substantial current to flow through the bulb from the battery and thus turns the lamp to an "on" state.

Figure 3:
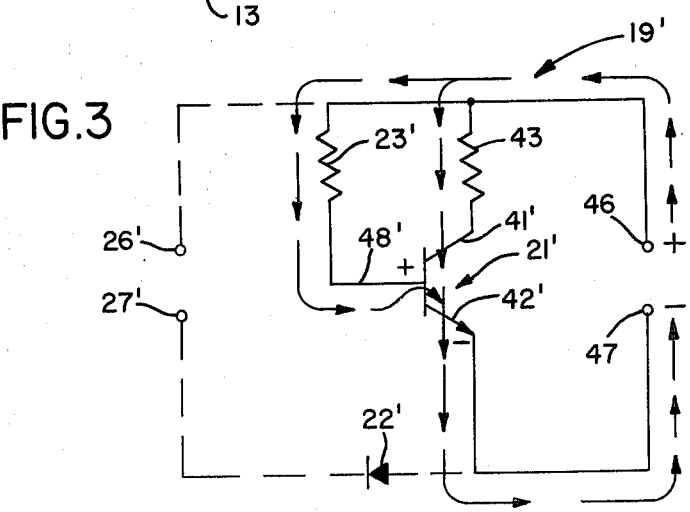
FIGS. 3 and 4 are further schematic diagrams illustrating the on and off switching conditions of the solid state switching circuit according to the present invention.
Figure 4:
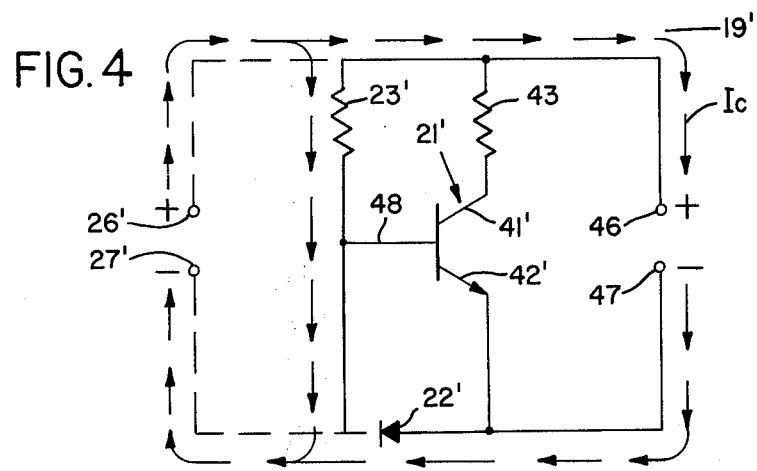

Particularly, these two modes of operation are best illustrated in FIGS. 3 and 4 showing the switching circuit means 19' in a generalized configuration. In such case, the light bulb 16 has been replaced by more generalized load impedance 43 and battery 17 is shown merely as a plus and minus voltage applied to terminals 46 and 47 respectively. FIG. 3 shows the condition of circuit means 19' in the absence of the externally applied voltage at terminals 26' and 27' in which transistor 21 is in its low impedance condition and load impedance 43 is energized. FIG. 4 on the other hand shows the circuit in the alternate mode in which transistor 21' is in its high impedance condition in response to the application of the external dc potential applied across terminals 26' and 27' and in which the load impedance 43 is unenergized.

With reference first to FIG. 4, the transistor 21' is switched off, that is switched to its high impedance condition between the collector and emitter electrodes by virtue of the overriding effect of the external potential applied to terminals 26' and 27' such that the battery or other potential applied to terminals 46 and 47 is nullified by an oppositely flowing current $I_c$ flowing from terminal 26' through the plus and minus terminals 46 and 47 to which battery 17 is connected in FIG. 2, through diode 22' in its forward conducting direction and returning to negative terminal 27'.

It is observed that in the operation of the circuit as shown in FIG. 4 that there exists a small forward potential drop across diode 22' even though it is in its forward bias direction. Since diode 22' is connected between the emitter electrode 42' and a control or base electrode 48' that this small forward voltage drop biases the emitter base electrodes to a condition in which transistor 21 is "cut off." That is, the base electrode 48' is slightly negative with respect to the emitter electrode 42' causing transistor 21' to assume its high impedance condition in the collector emitter current path. Thus, the load impedance 43 is unenergized in FIG. 4 and in FIG. 2 the light bulb 16 is turned "off." Simultaneously with reference to FIG. 2, the small current flow $I_c$ flowing against the normal current direction of battery 17 provides the above-mentioned trickle charge for a rechargeable battery. Also, it is noted that a current flows from the external source at positive terminal 26' through bias resistor 23' and returns to the negative terminal 27'. The size of this current flow will depend upon the impedance of biasing resistor 23' and the magnitude of the voltage applied across terminals 26' and 27'.

Now with reference to FIG. 3, assume that the external power source has failed or has been otherwise removed from terminals 26' and 27'. In such case there is no longer any current counteracting the tendency of the battery source supplied at terminals 46 and 47 from flowing as illustrated from the positive terminal and through two parallel branches of the switching circuit 19'. Furthermore, the polarity of the battery or other source applied at terminals 46 and 47 is such that diode 22' becomes reverse biased and thus assumes a relatively high impedance condition between the base and emitter electrodes 48' and 42' of the transistor. The net result of the reverse biased condition of diode 22' is the elimination of any current flow through this branch of the circuit or in other words an open circuit at the diode.

Accordingly the voltage at base electrode 48' relative to emitter electrode 42' is allowed to swing positive and a small amount of current flows through the biasing resistor 23' to the base electrode of transistor 21' turning the transistor to a saturated "on" state. Thereupon the collector-emitter path between electrodes 41' and 42' assumes its low impedance condition allowing current flow from the battery or other source applied at terminals 46 and 47 to flow through the load impedance 43. In FIG. 2, this current flow causes light bulb 16 to be energized by the flow of current from battery 17.

It is observed that in the operation of solid state switching circuit means 19, no change in the impedance of the biasing resistor 23 is required. Thus, the switching circuit in addition to its use in combination with the emergency lamp of the present invention has utility as a general purpose switching circuit in which it is undesirable or impossible to alter the biasing impedance.

When power is restored at receptacle 12 or lamp 11 is returned to receptacle 12, the switching circuit means 19 returns to the conditions shown in FIG. 4 in which the load impedance 43 is unenergized and bulb 16 is extinguished and the battery charging current $I_c$ is re-established.

Although most any rechargeable battery may be used in the circuit of FIG. 2, the presently disclosed embodiment employs two serially connected rechargeable nickel cadmium cells, D-cells carried in lamp body 18, and which together develop approximately 2.4 volts for battery 17 in FIG. 2. For proper operation of switching circuit means 19' and for charging of battery 17, the voltage available across terminals 26 and 27 from the external source should be just slightly in excess of the nominal battery voltage. Thus, in the present circuit, the voltage across terminals 26 and 27 during the off condition of lamp 16 and charging of battery 17 is approximately 2.5 to 2.6 volts dc.

In the embodiment illustrated in FIG. 2, the output of the full wave rectification bridge 28 may exhibit a ripple which adversely affects the operation of solid state switching circuit means 19. Accordingly, as illustrated here, a filter capacitor 51 may be provided across the emitter and base electrodes 42 and 48 for filtering undesirable voltage ripple thereacross. Although the values and types of components utilized in the circuit shown in FIG. 2 may be selected according to the application and needs of the designer, the following list of components and values is provided as one example of an operable embodiment:

Bridge 28 — full wave diode bridge — 1 amp, 600 volts dc, 420 volts ac.
Battery 17 — NiCad 1.2 AH 2 cells.
Diode 22 — 1 amp, 100 volts.
Biasing Resistor 23 — 330 ohms, ½ watt.
Dropping Resistor 36 — 5600 ohms, 2 watts.
Bulb 16 — 2.2 volts, 250 milliamps
Resistor 39 — 1 megohm
Transistor 21 — HEP 721 (NPN)
Capacitor 51 — 12 volt, 4.7 microfarad, electrolytic The foregoing circuit parameters have been found to provide a charging current $I_c$ of approximately 8 milliamps to battery 17. The optimum charging current will depend upon the type and size of rechargeable batteries used. Because the device may be connected in a condition in which the charging of battery 17 continues indefinitely, a very slow charging rate for the particular battery in use should be selected. For example, here a 200 to 300 hour charging rate is used for the nickel cadmium batteries carried by lamp 11.

Also, it will be recognized that the particular polarities of the components shown in FIGS. 2–4 may be reversed if desired by merely changing the transistor to a PNP type instead of the NPN type shown here and reversing the polarity orientations of the battery 17, diode 22, rectifier bridge 28 and electrolytic capacitor 51.

Figure 6:
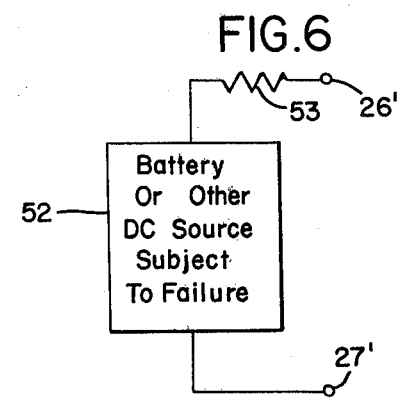
FIG. 6 is another schematic showing the manner in which the present invention is used with an external source of dc potential.

Although the embodiment shown in FIGS. 1 and 2 contemplates the use of the invention in conjunction with a standard ac line voltage, the emergency lamp may also be used in environments having direct current voltage as the primary power source. For example, in marine applications, the electrical lights and appliances of a ship may typically be provided by dc voltages of 6, 12, 28 or 32 volts. In such case, and as shown in FIG. 6, the terminals 26' and 27' of switching circuit means 19' may be connected to the direct current source 52 which may be a battery or other dc power source. A suitably selected dropping resistor 53 may be required in such case to provide the proper voltage at terminals 26' and 27'. In this case of course filter capacitor 51 need not be provided in the switching circuit means 19.

With respect to the physical construction of lamp 11 illustrated in FIG. 1, hollow cylindrical body 18 may be constructed similarly to a conventional flashlight including holding and electrical terminal means therein for retaining and connecting the two rechargeable cells forming battery 17. Similarly light bulb 16 may be mounted within a conventional lamp socket having the terminals thereof extended through conductors for connection in the circuit as shown in FIG. 2. The various transistor, diode, resistive and capacitve components of the circuit of FIG. 2 are of such a small size that they may be neatly packaged and retained within housing 14 which as shown protrudes slightly from body 18. In the alternative, the electronic components may be mounted at any suitable location on or in the portable lamp.

Figure 7:
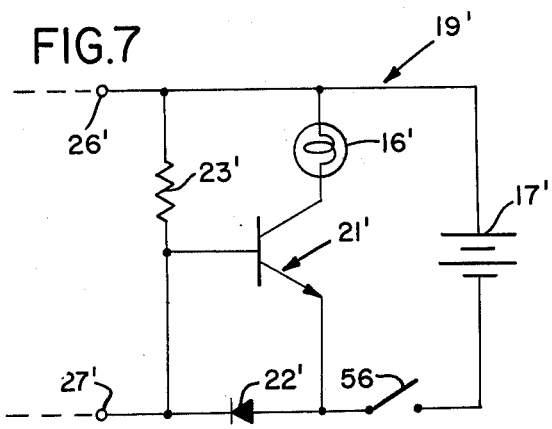
FIG. 7 is a schematic diagram similar to FIG. 2, although showing an alternative arrangement including an optional, electromechanical switch for overriding the energization of the lamp.

With reference to FIGS. 7 and 8, a further alternative embodiment of the present invention is illustrated in which an auxiliary, optional electromechanical switch 56 is disposed with normally open contacts in series between battery 17' and the serial connection of the collector-emitter path of transistor 21' and bulb 16' as shown. The normally open contacts of switch 56 may be selectively, manually closed to energize the bulb 16' when the lamp is removed from the receptacle 12. In other words, switch 56 permits manual control over the energization of bulb 16 when lamp 11 is removed from receptable 12. Thus, the lamp 11 may be detached from the receptacle and used as a conventional flashlight with a manual "on" - "off" switch.

Figure 8A:
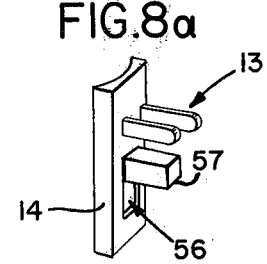
FIGS. 8a and 8b illustrate a particular electromechanical actuator for the optional switch shown in the circuit of FIG. 7.
Figure 8B:
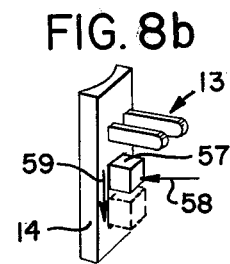

Moreover, switch 56 may be embodied as illustrated in FIGS. 8a and 8b such that its normally open contacts are automatically returned to the closed condition when plug 13 is inserted into a receptacle 12. Particularly, FIG. 8a illustrates a spring loaded actuator 57 which is depressible inwardly as indicated by arrow 58 in FIG. 8b to dispose the contacts of switch 56 in their closed condition and is spring biased outwardly to the condition shown in FIG. 8a to allow the contacts to return to the normally open condition. Thus whenever plug 13 of lamp 11 is inserted in receptacle 12, actuator 57 is automatically urged to its depressed condition as shown in FIG. 8b to establish the connection of the battery to switching circuit 19'.

With actuator 57 mounted in this manner a manual override switch is provided for use when lamp 11 is removed from receptacle 12, and yet the lamp when returned to the receptacle is always in a condition for responding to an emergency power failure.

The operation of this feature is as follows: With plug 13 inserted in receptacle 12, housing 14 is moved into a closely confronting relationship to the plate of receptacle 12, thus depressing spring loaded actuator 57 inwardly in the direction of arrow 58. This moves the contacts of switch 56 from their normally open positon as shown in FIG. 7 to the closed condition. If the power fails, light bulb 16 will be automatically energized in accordance with the operation described above.

If lamp 11 is removed from the receptacle 12 either following an emergency power loss or merely to use the lamp as a portable flashlight, actuator 57 is released under the spring bias to an outwardly extended condition as shown in FIG. 8a. This opens the contacts of switch 56 extinguishing light bulb 16'. To re-energize the light bulb, actuator 57 is manually inwardly depressed again in the direction of arrow 58 and the lamp is returned to an "on" condition.

If desired, actuator 57 may be provided with a manual lock or latching operation of well known design in which a lateral, or in this instance, downward motion of actuator 57 in the direction of arrow 59 while in the depressed condition will result in mechanically latching the actuator 57 in the position shown by dotted lines in FIG. 8b. This locks or latches the lamp 11 in the "on" condition while detached from receptacle 12.

Only a limited number of embodiments of the present invention have been disclosed herein. It will be readily apparent to persons skilled in the art that numerous changes and modifications may be made to these embodiments without departing from the spirit of the invention. For example, a further alternative embodiment of the invention may provide for a manual override switch in which lamp 11 may be turned on while plugged into receptacle 12 and during normal availability of electrical power to receptacle 12. Such an override switch may be desirable to render lamp 11 useful as a night light which may be switched on and off, where switching to the off state would still allow the lamp to respond to an emergency power loss. Such a manual "turn on" override switch could be provided at several suitable locations within the circuit for driving light bulb 16 from the source of power derived from the line voltage available at receptacle 12. For this purpose it may be desirable to include a small stepdown transformer for reducing the ac line voltage at receptacle 12 down to a level suitable for powering light bulb 16 and simultaneously providing for a small charge current for the battery 17.

Although the foregoing described embodiments of the invention provide a portable lamp 11 which may be detached from receptacle 12, in the alternative a permanently mounted wall, ceiling or cabinet light may be provided in which the circuit is permanently electrically connected to the line voltage through a suitable rectification or other ac to dc conversion circuit. Still another embodiment may provide a lamp with a permanently mounted base and a detachable illumination unit with the light bulb, batteries and solid state switching circuit mounted in the latter. In other words, the lamp unit would be similar to lamp 11, however, instead of plugging the lamp into a wall receptacle 12, it would be plugged into a permanently mounted base containing a rectifier and if desired, a transformer for stepping down the voltage prior to rectification.

Although the particular construction of the embodiment of the invention shown in FIGS. 1 and 2 above provides for a relatively low or moderate intensity illumination by battery 17, the invention may be adapted to provide high intensity flood or spotlight illumination by appropriate selection of the light bulb 16 and batteries 17. Such flood or spotlight illumination may be provided either in the portable lamp 11 or in the permanently mounted lamp of the immediately above-described alternative configuration.

Further still, the lamp may be adapted not only for home use but also for commercial and industrial use as a low cost, reliable replacement of the existing wet cell emergency units discussed above. Because of the compactness of the solid state switching circuit means 19, it is possible to package the emergency lighting in a more discreet and aesthetic arrangement than is possible with existing emergency light source and this constitutes another advantage of the present invention for use in professional and business offices.

In the case of heavy duty industrial and commercial use, the circuitry of the presently disclosed embodiment may be modified to include moderate to heavy power silicon controlled rectifiers driven by transistor 21 for controlling the electrical power to the larger light bulbs or lamps.

The present invention also constitutes an advantageous replacement for existing voltage relay operated, dry cell powered naval shipboard emergency hand lanterns. Currently such lanterns use relay fixtures and these fixtures could be advantageously converted to receptacles for supplying the normally available charging voltage to a lantern having the battery, lightbulb and solid state switching circuit means mounted therein. The dry cells would thus be replaced by rechargeable Nicad or similar batteries, thus avoiding the high cost of periodic dry cell replacement necessary for maintaining the existing devices. Furthermore, maintenance of the relay devices would be eliminated.

As will be apparent, the foregoing specifically disclosed embodiments are for illustrative purposes only and do not in any way limit the invention which is defined only by the following claims.

I claim:

1. An emergency light for connection to a normally "on" alternating current electrical power source which source is subject to occasional power failure, comprising:
   electrical means adapted for connection to said power source and including a capacitive-reactance and rectifier circuit for providing rectified voltage pulses to thereby provide a direct current charging voltage so long as said power source is "on";
   an electrically energized light;
   a battery for energizing said light; and
   a solid state switching circuit means including,
   a transistor switching device having collector, emitter and base electrodes connecting said light across said battery and said transistor having a low impedance condition in which said light is energized by said battery and a high impedance condition in which said light is substantially unenergized, and
   a diode connected between said emitter and said base electrodes of said transistor switching device and a biasing impedance coupled between said base electrode and said collector electrode of said transistor switching device and said biasing impedance further coupled to said battery, whereby when said electrical power source is in the normally "on" condition, said diode is forward biased by said direct current battery charging voltage from said capacitive-reactance and rectifier circuit of said electrical means to cause said transistor switching device to assume said high impedance condition to thereby maintain said light substantially unenergized and when said electrical power source is not in the normally "on" condition, said diode is reverse biased by said battery to cause said transistor switching device to assume said low impedance condition to thereby maintain said light substantially energized, and
   a capacitor connected in parallel with said diode between said emitter and said base electrodes of said transistor to prevent said transistor from changing to its low impedance state momentarily and repeatedly between rectified voltage pulses while said battery is being charged.

2. The emergency light defined in claim 1, further comprising an auxiliary, manually operated switch connected in series with said battery and said light whereby the emergency light once automatically energized by loss of said electrical power source may be selectively, manually turned "on" or "off."

3. An emergency light for connection to a normally "on" alternating current electrical power source provided by a standard wall receptacle which source is subject to occasional power failure, comprising:
   a standard plug for detachable mechanical and electrical insertion into said standard wall receptacle,
   rectification means including capacitive-reactance means adapted for connection to said standard plug and providing rectified voltage pulses to thereby provide a direct current charging voltage so long as said power source is "on";
   a light bulb;
   a battery;
   a solid state switching circuit means including a transistor switching device having collector, emitter and base electrodes connecting said light bulb across said battery and said transistor having a low impedance condition in which said bulb is energized by said battery and a high impedance condition in which said bulb is substantially unenergized,
   a diode connected between said emitter and said base electrodes of said transistor switching device and a biasing impedance coupled between said base electrode and said collector electrode of said transistor switching device and said biasing impedance further coupled to said battery, whereby when said electrical power source is in the normally "on" condition, said diode is forward biased by said direct current voltage from said electrical source to cause said transistor switching device to assume said high impedance condition to thereby maintain said light bulb substantially unenergized;

a capacitor connected in parallel with said diode between said emitter and said base electrodes of said transistor to prevent said transistor from changing to its low impedance state momentarily and repeatedly between rectified voltage pulses while said battery is being charged, and a portable hand lantern housing in which said standard plug, rectification means, light bulb, battery and transistor switching device are all mounted for insertion into a standard wall receptacle to provide said normally "on" condition;

whereby said light bulb is energized by a power failure or in the alternative by manually detaching said housing and said plug mounted thereto from said receptacle to afford use of said emergency light as a hand-carried portable lantern or flashlight.

4. An emergency signalling device for connection to a normally "on" electrical power source which source is subject to occasional power failure, comprising:

electrical means adapted for connection to said power source and providing a direct current voltage so long as said power source is "on";

an electrically energized source of signals;

a battery for energizing said source of signals;

a solid state switching circuit means including,
   a transistor switching device having collector, emitter and base electrodes connecting said source of signals across said battery and said transistor having a low impedance condition in which said source of signals is energized by said battery and a high impedance condition in which said source of signals is substantially unenergized, and a diode connected between said emitter and said base electrodes of said transistor switching device and a biasing impedance coupled between said base electrode and said collector electrode of said transistor switching device and said biasing impedance further coupled to said battery, whereby when said electrical power source is in the normally "on" condition, said diode is forward biased by said direct current voltage from said electrical means to cause said transistor switching device to assume said high impedance condition to thereby maintain said source of signals substantially unenergized and when said electrical power source is not in the normally "on" condition, said diode is reverse biased by said battery to cause said transistor switching device to assume said low impedance condition to thereby maintain said source of signals substantially energized, and an auxiliary, manually operated switch connected in series with said battery and said source of signals comprising a normally open switch, actuator means for said auxiliary switch, said actuator means automatically disposing said auxiliary switch in its closed condition when said electrical means is connected to said power source and for automatically returning said auxiliary switch to its normally open condition upon disconnection of said electrical means from said power source to permit manual control of said actuator means to dispose said auxiliary switch in either its open or closed condition for selective energization of said source of signals by said battery.

* * * * *